(12) United States Patent
Wong et al.

(10) Patent No.: US 9,743,321 B2
(45) Date of Patent: Aug. 22, 2017

(54) MOBILITY TECHNIQUES

(71) Applicant: Alcatel Lucent, Boulogne Billancourt (FR)

(72) Inventors: Shin Horng Wong, Swindon (GB); Nicola Puddle, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/910,327

(22) PCT Filed: Jul. 21, 2014

(86) PCT No.: PCT/EP2014/001988
§ 371 (c)(1),
(2) Date: Feb. 5, 2016

(87) PCT Pub. No.: WO2015/018486
PCT Pub. Date: Feb. 12, 2015

(65) Prior Publication Data
US 2016/0174117 A1    Jun. 16, 2016

(30) Foreign Application Priority Data

Aug. 7, 2013  (EP) .................................... 13306136

(51) Int. Cl.
*H04W 4/00* (2009.01)
*H04W 36/00* (2009.01)
(Continued)

(52) U.S. Cl.
CPC ....... *H04W 36/0083* (2013.01); *H04W 36/04* (2013.01); *H04W 36/30* (2013.01); *H04W 36/36* (2013.01); *H04W 84/045* (2013.01)

(58) Field of Classification Search
CPC ..... H04W 36/04; H04W 48/18; H04W 8/245; H04M 1/72419
(Continued)

(56) References Cited

U.S. PATENT DOCUMENTS 9,008,659 B1 * 4/2015 Choi ..................... H04W 36/04
                                                        370/331
9,332,460 B2 * 5/2016 Lee ................... H04W 36/0022
(Continued)

FOREIGN PATENT DOCUMENTS

GB      2 492 183 A      12/2012
JP      2010-273114      12/2010
(Continued)

OTHER PUBLICATIONS

"3rd Generation Partnership Project; Technical Specification Group Radio Access Network; Study on UMTS Heterogeneous Networks; (Release 12)," 3GPP TR 25.800 V1.0.1, pp. 1-54, XP050692577, (Jun. 2013).
(Continued)

*Primary Examiner* — Danh Le
(74) *Attorney, Agent, or Firm* — Fay Sharpe, LLP

(57) ABSTRACT

A method of influencing operation of user equipment in a wireless telecommunications network, a computer program product and network control node operable to perform that method. The method comprises: providing user equipment with a neighbor cell list; selecting at least one priority criteria to be applied by user equipment to a cell included in said neighbor cell list; and communicating the selected priority criteria to user equipment, determining an action to be taken by user equipment in relation to a cell meeting said priority criteria and communicating said action to user equipment and wherein the action comprises: a measurement performance requirement to be applied in relation to a
(Continued)

Dense LPN deployment, with initial priority list cell having a priority. It will be appreciated that aspects and embodiments may define a means to manage an expected increase in size of an NCL in HetNet deployments without a need to significantly increase user equipment complexity to meet measurement performance requirements.

11 Claims, 2 Drawing Sheets

(51) Int. Cl.
   *H04W 36/30* (2009.01)
   *H04W 84/04* (2009.01)
   *H04W 36/04* (2009.01)
   *H04W 36/36* (2009.01)

(58) Field of Classification Search
   USPC .......................... 455/444, 435.3, 418, 550.1
   See application file for complete search history.

(56) References Cited

U.S. PATENT DOCUMENTS

| | | | |
|---|---|---|---|
| 2009/0047958 A1 | 2/2009 | Rimhagen et al. | |
| 2010/0130212 A1* | 5/2010 | So | H04W 36/08 455/444 |
| 2010/0291927 A1* | 11/2010 | Wu | H04W 48/20 455/435.3 |
| 2010/0330943 A1* | 12/2010 | Hoepfner | H04B 17/318 455/226.2 |
| 2013/0084849 A1 | 4/2013 | Koskinen et al. | |
| 2013/0084850 A1* | 4/2013 | Martin | H04W 24/10 455/423 |
| 2013/0109732 A1* | 5/2013 | Matsuzaki | A01N 43/56 514/406 |
| 2013/0189971 A1 | 7/2013 | Callender et al. | |
| 2013/0273916 A1* | 10/2013 | Gupta | H04W 36/34 455/436 |

FOREIGN PATENT DOCUMENTS

| | | |
|---|---|---|
| JP | 2010-537478 | 12/2010 |
| WO | WO 2008/102531 | 8/2008 |
| WO | WO 2009/022967 A | 2/2009 |
| WO | WO 2009/054702 A1 | 4/2009 |

OTHER PUBLICATIONS

International Search Report for PCT/EP2014/001988 dated Aug. 25, 2014.

* cited by examiner

HetNet deployment

Dense LPN deployment, with initial priority list

Dense LPN deployment, after UE 1 moves

MOBILITY TECHNIQUES

FIELD OF THE INVENTION

A method of influencing operation of user equipment in a wireless telecommunications network, a computer program product and network control node operable to perform that method.

BACKGROUND

Wireless telecommunications systems are known. In such systems, mobile communication devices (for example, mobile telephones) are operable to communicate with base stations provided by network providers.

In known wireless telecommunications systems, radio coverage is provided to network connectible devices such as mobile telephones, or wireless devices such as iPads or other similar tablets, within areas known as cells. A base station is typically located in each cell to provide radio coverage. Network connectible devices in each cell are typically operable to receive information and data from a base station and to transmit information and data to a base station.

User equipment roam through a wireless communication system. Base stations are provided which support those areas of radio coverage. A number of such base stations are provided and are distributed geographically in order to provide a wide area of coverage to user equipment.

When user equipment is within an area served by a base station, communications may be established between the user equipment and the base station over associated radio links. Each base station typically supports a number of sectors within a geographical area of service. Typically, a different antenna within a base station supports each associated sector. Each base station has multiple antennas.

Traditional base stations provide coverage in relatively large geographical areas and those cells are often referred to as "macro" cells. It is possible to provide a heterogeneous network (HetNet) where smaller sized cells are provided within macro cells. Such smaller sized cells are sometimes referred to as micro cells, metro cells, pico cells or femto cells. One way to establish a small cell is to provide a small cell base station, also known as a low power node, which provides coverage having a relatively limited range within the coverage area of a macro cell.

The transmission power of a small cell base station is relatively low and, as a result, each small cell provides a small coverage area in comparison to that provided by a macro cell and may be used, for example, to provide coverage in a network hot spot or an office or a home.

Small cells are typically provided where communications coverage provided by a macro cell is poor, or where a user wishes to use an alternative communications link provided locally by a small cell base station to communicate with a core network. Small cells can also be provided to increase capacity within a network.

Although the deployment of small cell base stations can provide advantages, unexpected consequences can occur.

Accordingly, it is desired to provide techniques suited to the operation of networks including small cell base stations.

SUMMARY

A first aspect provides a method of influencing operation of user equipment in a wireless telecommunications network; the method comprising: providing user equipment with a neighbour cell list; selecting at least one priority criteria to be applied by user equipment to a cell included in the neighbour cell list; and communicating the selected priority criteria to the user equipment, determining an action to be taken by user equipment in relation to a cell meeting said priority criteria and communicating said action to user equipment and wherein the action comprises: a measurement performance requirement to be applied in relation to a cell having a priority.

The first aspect recognises that small cells deployed within a macro cell layer may be used to improve capacity of a system. Provision of small cells within a network can result in both gains and losses. Gains may be achieved by offloading traffic from a macro cell to small cells and it can be shown that significant capacity improvement can be achieved by means of a HetNet deployment when compared to that of a homogeneous (macro cell only) network deployment. However, there are also losses or difficulties associated with HetNet network deployments.

One such issue is that the deployment of multiple small cells within a macro cell layer can make dealing with mobility of user equipment a challenge. In particular, the provision of multiple small cells can result in very frequent handover and/or the triggering of other mobility between cells as a user roams within a network. Existing techniques designed for operation in a homogeneous network deployment may be unsuited to a network deployment including multiple small cells.

Aspects and embodiments described aim to address mobility issues, and user equipment performance using techniques which may be applicable in both co-channel and dedicated frequency deployments of macro base stations and Low Power Nodes (LPN). Those deployments may generically be referred to as heterogeneous networks. It will be appreciated that LPNs may support a metro, pico, small or femto cell, and that macro base stations support cells typically referred to as macro cells.

The first aspect recognises that provision to user equipment of a Neighbour Cell List (NCL) is useful in supporting mobility of user equipment within a network. The first aspect recognises that one means by which user equipment receives information about the network in which it is operating is via a Neighbour Cell List (NCL). Such an NCL provides user equipment with an indication of base stations from which it may be able to receive a signal, or with which it may be able to establish a radio connection in a given location within a network. That is to say, a typical NCL comprises a list of cells (or Cell IDs) which may be of relevance to mobility events. A NCL is typically used by user equipment to identify suitable handover or reselection candidates. A NCL is typically maintained by a network control node (for example, an RNC) and an NCL is provided to user equipment operating within a network via a network access node (for example, a base station) which transmits a System Information Broadcast message (SIB). That SIB may be received by all user equipment operating within the radio coverage region of that macro base station.

Aspects and embodiments recognise that in a HetNet deployment, it is likely that there will be an increase in the number of cells which are discoverable and which may prove to be sensible candidates for cell reselection or handover to user equipment. Aspects and embodiments recognise that such an increase in cells within a network may result in an increase in the number of cells included within an NCL and/or a HetNet deployment may be such that an increase in the size of a traditional NCL is required in order to manage the expected increase in LPNs provided within a network. Aspects recognise that very dense LPN deployment may occur where a macro sector exists, and that for any given macro sector many LPNs may be provided within its coverage.

User equipment measurement capability is limited and, thus, a very full NCL and/or an NCL having an increased size may impose a higher complexity to operation of user equipment. Furthermore, it will be appreciated that many of the candidates listed within an NCL may be inappropriate or largely irrelevant to user equipment operating in a particular region. Some aspects aim to address how to manage mobility within a HetNet. In particular, some aspects may provide methods to manage mobility of user equipment operating in a HetNet where a significant number of LPNs is expected.

The first aspect recognises that whilst it is possible to implement a "dynamic" NCL to be used by user equipment within coverage of a macro cell and such a dynamic NCL could change as a user equipment moves position and roams within a given macro cell, in a dense LPN deployment, even for user equipment moving with an average speed, it will be understood that a neighbour cell environment is likely to change a number of times. Such roaming is likely to lead to numerous changes in a "dynamic" NCL. To support such numerous changes to an NCL, a high level of RRC signalling to user equipment would be required. Since RRC signalling is slow, such changes may be obsolete as soon as they are complete.

Aspects and embodiments allow an NCL to be provided to user equipment in such a manner that it is possible to assign or divide those cells included within an NCL to clusters or groups having a different priority. Each group has a different priority and those priority groups may have different performance requirements in terms of measurements required at the user equipment.

In other words, whilst a network control node may control parameters which operate to set a priority to be applied by user equipment, but it is user equipment which applies those priority criteria to cells in the neighbour cell list and it is user equipment which operates to take action in response to a priority, once set in relation to a cell. It will be understood that dynamic steps will typically be taken by user equipment, rather than a network, as user equipment moves within the network.

For example, cells in a "lower" priority group may, in some embodiments, have a lower measurement performance requirement when compared to those cells included in an NCL which have been determined by user equipment to be associated with a "higher" priority. In some embodiments, priority assigned to cells included in an NCL can be managed by the user equipment rather than the network and, thus, frequent RRC signalling may be avoided. As a result of assigning priority to cells within the NCL, user equipment may be operable to concentrate its measurements on those cells which may have the largest impact on user equipment mobility; that is to say, those cells which have a high probability of use as a handover or cell reselection cell.

Assignment of priority in accordance with priority criteria set by a network can allow user equipment to focus on relatively more important or relevant cells in its NCL. Such a method may be of particular use in a HetNet where a NCL may include a large number of small cell IDs, those cells being supported by Low Power Nodes in a network. Many of those small cells may not represent useful handover or cell reselection targets to user equipment in an area of a macro cell which is distant to those small cells. A method in accordance with the first aspect allows the network to assist user equipment to filter cells included in a NCL and tailor user equipment accordingly.

In one embodiment, selecting at least one priority criteria to be applied by the user equipment to a cell included in the neighbour cell list comprises: assigning a priority to each cell in the neighbour cell list. Accordingly, a network control node may be operable to apply a priority to each cell included in a neighbour cell list. Those priorities may comprise groups, or clusters, or priorities. Those priorities may be allocated or associated with a cell based on historical user equipment movement through a cell. That historical data may be continuously updated based on user movement through a cell, and priorities over a longer time frame updated accordingly. Such a priority list may be sent to user equipment on an individual basis, or broadcast using appropriate messaging techniques.

In one embodiment, selecting at least one priority criteria to be applied by user equipment to a cell included in the neighbour cell list comprises: receiving an indication of user equipment location and assigning a priority to each cell in the neighbour cell list based on said indication of user equipment location. Accordingly, a network control node may be able to provide a user equipment specific set of priority cell clusters. That individual priority list to be applied to a general neighbour cell list may be generated to reflect a position of a user within a network. A network may be aware of a general location of user equipment by various means. In particular, the general location of a user may be determined through identification of a serving cell, reported pilot signal(s) received by user equipment and other similar techniques. In one embodiment, the indication of user equipment location comprises: measurement received from the user equipment. In one embodiment, the measurement comprises a RACH measurement report. In one embodiment, the measurement comprises a GPS report or a proximity report. Accordingly, if a network control node is aware of user equipment location, an appropriate priority grouping to be applied to those cells included in a NCL can be communicated to the user equipment.

In one embodiment, the priority criteria comprises: a threshold cell signal quality associated with a priority to be applied to a cell in the neighbour cell list by user equipment. Accordingly, rather than directly communicate a priority grouping assigned by a network control node to user equipment, it is possible to let user equipment apply appropriate criteria to cells which are in a NCL. Priority may be assigned to cell on the basis of measurements received at user equipment. In such a scenario, as a user moves, the priorities applied to cells in a NCL may be dynamically updated at user equipment, without need for RRC signalling. Priority may be allocated to a cell in a series of "steps" or increments. That is to say, a cell priority may be increased by an increment if a received signal strength passes a threshold value. Similarly, it may be increased by a further increment if a further threshold value is passed. If a cell signal strength falls below a threshold value, priority may be reduced by an appropriate increment.

In one embodiment, the priority criteria comprises: a threshold proximity measurement associated with a priority to be applied to a cell in the neighbour cell list by the user equipment. Accordingly, those user equipment configured to determine their proximity to a cell or point in a network may have priority settings and thresholds set by a network in relation to such proximity measurements.

In one embodiment, the priority criteria comprises: an indication of a number of cells in the neighbour cell list to be assigned to a priority. In some embodiments, even if a threshold value has been reached by a number of cells in a user's NCL, the network may implement priority lists such that only the "best" cells or a pre-determined number of cells can be assigned a given priority by user equipment. Such operation may assist a network control node in maintaining control of a network in which user equipment has been given a degree of autonomy in relation to its operation.

In one embodiment, the priority criteria comprises: an indication of a proportion of cells in the neighbour cell list to be assigned to a priority. Accordingly, rather than a number, a network may request that user equipment maintain a proportion of cells in a NCL at each available priority level.

In one embodiment, the method comprises: determining an action to be taken by user equipment in relation to a cell meeting the priority criteria and communicating the action to user equipment. It will be appreciated that a network may explicitly assign user equipment behaviour or actions to be taken in relation to a cell having a particular priority level.

In one embodiment, the action comprises: a measurement performance requirement to be applied in relation to a cell having a priority. In one embodiment, the action comprises: a periodicity associated with a measurement report applied in relation to a cell having a priority. Accordingly, those cells determined to have a high priority, and which are likely to be particularly relevant to mobility events associated with a user may be allocated a more stringent measurement report regime, whereas those of lower relevance to mobility events for a user may have a relaxed measurement report regime.

A second aspect provides a computer program product operable, when executed on a computer, to perform the method of the first aspect.

A third aspect provides a network control node operable to influence operation of user equipment in a wireless telecommunications network; the network control node comprising: neighbour cell list provision logic operable to provide user equipment with a neighbour cell list; priority criteria selection logic operable to select at least one priority criteria to be applied by user equipment to a cell included in the neighbour cell list; communication logic operable to communicate the selected priority criteria to user equipment; determination logic operable to determine an action to be taken by said user equipment in relation to a cell meeting said priority criteria and communicate said action to said user equipment, wherein said action comprises: a measurement performance requirement to be applied in relation to a cell having a priority.

In one embodiment, priority criteria selection logic operable to select at least one priority criteria to be applied by user equipment to a cell included in the neighbour cell is operable to assigning a priority to each cell in the neighbour cell list.

In one embodiment, priority criteria selection logic operable to select at least one priority criteria to be applied by user equipment to a cell included in the neighbour cell is operable to receive an indication of user equipment location and assign a priority to each cell in the neighbour cell list based on said indication of user equipment location.

In one embodiment, the indication of user equipment location comprises: measurement received from the user equipment.

In one embodiment, the measurement comprises a RACH measurement report.

In one embodiment, the measurement comprises a GPS report or a proximity report.

In one embodiment, the priority criteria comprises: a threshold cell signal quality associated with a priority to be applied to a cell in the neighbour cell list by user equipment.

In one embodiment, the priority criteria comprises: a threshold proximity measurement associated with a priority to be applied to a cell in the neighbour cell list by the user equipment.

In one embodiment, the priority criteria comprises: an indication of a number of cells in the neighbour cell list to be assigned to a priority.

In one embodiment, the priority criteria comprises: an indication of a proportion of cells in the neighbour cell list to be assigned to a priority.

In one embodiment, the network control node further comprises: determination logic operable to determine an action to be taken by user equipment in relation to a cell meeting the priority criteria and communicate that action to user equipment.

In one embodiment, the action comprises: a measurement performance requirement to be applied in relation to a cell having a priority.

In one embodiment, the action comprises: a periodicity associated with a measurement report applied in relation to a cell having a priority.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

In a UMTS network architecture, user equipment roam through a wireless telecommunications system. Base stations are provided which support areas of radio coverage. A number of such base stations are provided and are distributed geographically in order to provide a wide area of coverage to user equipment.

When user equipment is within an area served by a base station, communication may be established between the user equipment and the base station using associated radio links. Each base station typically supports a number of sectors within the geographical area of service.

Typically, different antenna within a base station supports each associated sector. Each base station has multiple antennas. It will be appreciated that a large number of user equipment and large number of base stations may be present in a typical communication network. It will also be appreciated that different network architectures may be implemented including, for example, a Long Term Evolution (LTE) network in which the functionality provided by network nodes described above is provided by network nodes which can be named differently but have analogous functionality.

Traditional base stations provide coverage in relatively large geographical areas and those cells are often referred to as macro cells. It is possible to provide a heterogeneous network (HetNet) where smaller sized cells supported by small cell base stations, sometimes referred to as low power nodes, are provided within macro cells supported by macro base stations. Such smaller sized cells are often referred to as micro cells, metro cells, pico cells or femto cells. One way to establish a small cell is to provide a small cell base station that provides coverage having a relatively limited range within the coverage of the macro cell.

The transmission power of a small cell base station is relatively low and therefore each small cell typically provides a small radio service coverage area to user equipment compared to that provided by a macro cell. Typically, a small cell would be used to provide radio coverage in an office or a home.

Such small cells are typically provided where the communications coverage provided by a macro cell is poor, or where a user wishes to use an alternative communications link provided locally by a small cell base station, to communicate with the core network and/or to increase capacity within a network. That is to say, in a heterogeneous network, small cells supported by low power nodes (LPN) can be placed within a macro cell supported by a macro cell base station. Provision of low power nodes within a network may operate to increase the capacity of the network by allowing the offloading of some user equipment and the traffic associated with that user equipment from a macro cell layer to a layer provided by the low power nodes.

Figure 1:
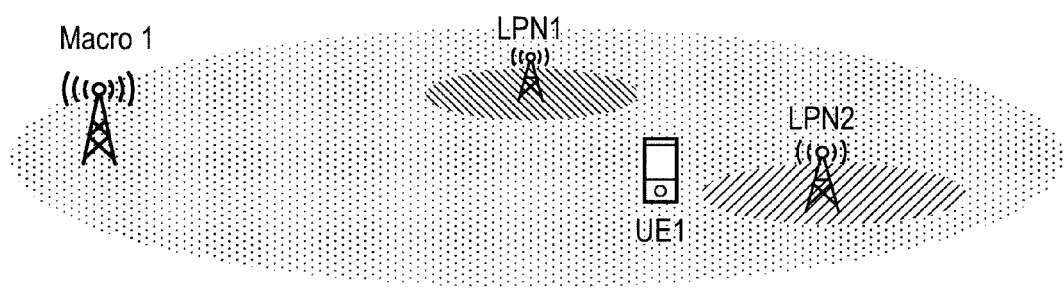
FIG. 1 illustrates schematically an example HetNet deployment.

FIG. 1 illustrates schematically a network comprising a macro base station and two low power nodes. Each low power node LPN1, LPN2 supports a small cell. A macro base station supports a region of radio coverage known as a macro cell. User equipment (UE1) can freely roam within the regions of radio coverage provided by the macro base station and the two low power nodes. In the example illustrated, the UE is operable to move across the two small cells and the macro cell. In the case of the UE moving at high speed, such movement across cell boundaries may cause a high level of RRC signalling, as the UE tries to implement handovers or reselection between cells. That handover or reselection process and associated signalling may offer very little benefit in terms of traffic offloading to the network, since the UE is unlikely to spend much time in each small cell.

Aspects and embodiments recognise that user equipment is typically operable to implement cell reselection and handover processes with reference to a Neighbour Cell List (NCL). That NCL provides user equipment with an indication of candidate cells for cell reselection and/or handover. Aspects and embodiments recognise that user equipment measurement capacity may be limited and that inclusion of a large number of neighbour cells in a neighbour cell list may be impractical in terms of measurements to be taken by user equipment. In particular, requiring a uniform level of measurement across all cells included in a neighbour cell list may impose a need for a more highly complex measurement method by user equipment, or increased user equipment complexity. Furthermore, it will be appreciated that it is unlikely that all cells included in a neighbour cell list may be an equally likely candidate for cell reselection or handover, given a position of user equipment within a network.

Overview

Before discussing the embodiments in any more detail, first an overview will be provided. Aspects and embodiments described aim to address mobility issues, performance impacts and possible optimizations which may be applicable in both co-channel and dedicated frequency deployments of macro and Low Power Nodes (LPN). Those deployments may generically be referred to as heterogeneous networks. It will be appreciated that LPNs may support a cell known as, for example, a metro, pico, small or femto cell.

Aspects and embodiments recognise that in a HetNet deployment, it is likely that there will be an increase in the number of cells which are discoverable and which may prove to be sensible candidates for cell reselection or handover to user equipment. Aspects and embodiments recognise that such an increase in cells within a network may result in an increase in the number of cells included within an NCL and/or a HetNet deployment may be such that an increase in the size of a traditional NCL is required in order to manage the expected increase in LPNs provided within a network. Aspects recognise that very dense LPN deployment may occur where a macro sector exists, and that for any given macro sector many LPNs may be provided within its coverage.

User equipment measurement capability is limited and, thus, a very full NCL and/or an NCL having an increased size may impose a higher complexity to operation of user equipment. Furthermore, it will be appreciated that many of the candidates listed within an NCL may be inappropriate or largely irrelevant to user equipment operating in a particular region. Aspects and embodiments can address how to manage mobility within a HetNet. In particular, some aspects may provide methods to manage mobility of user equipment operating in a HetNet where a significant number of LPNs are expected.

Aspects and embodiments allow an NCL to be provided to user equipment in such a manner that it is possible to assign or divide those cells included within an NCL into clusters or groups, each having a different priority. Each group has a different priority and those priority groups may have different performance requirements in terms of measurements required at the user equipment.

Cells in a lower priority group may, in some embodiments, have a lower measurement performance requirement when compared to those cells included in an NCL having a higher priority. In some embodiments, priority assigned to cells included in an NCL can be managed by the user equipment rather than the network and, thus, frequent RRC signalling may be avoided. As a result of assigning priority to cells within the NCL, user equipment may be operable to concentrate its measurements on those cells which may have the largest impact on user equipment mobility; that is to say, those cells which have a high probability of use as a handover or cell reselection cell.

According to known user equipment operation, user equipment typically implements a single measurement performance requirement for all cells which are included in an NCL. If the NCL size increases, or if the number of cells included in the NCL is particularly high, there is a requirement that measurement performance requirement is maintained the complexity of the user equipment is likely to increase. It is desirable to avoid such a significant increase in required user equipment complexity, and so to balance an increased number of cells being included in a NCL, measurement performance must be reduced. Such a reduction in measurement performance could affect mobility of user equipment, particularly in the case of a large LPN deployment within a network. Aspects and embodiments recognise that it is possible to implement a scheme whereby the user equipment can concentrate its measurements on those cells which are most likely to matter to its mobility. That is to say, user equipment may concentrate measurements on those cells that have a relatively high probability of being handed over to, or reselected. By concentrating user equipment performance on those cells which are most likely handover candidates or cell reselection candidates, the measurement requirements for those cells which are determined to have a lower priority can be reduced. As a result, overall average measurement performance of user equipment may be maintained and thus there may be no reduction in overall user equipment performance. Furthermore, such an arrangement may avoid a requirement to significantly increase user equipment complexity.

Various methods may be used to determine relative priority of cells included within an NCL. According to one embodiment, priority of a cell may be increased when it is determined, at user equipment, that a given cell's signal quality has passed a threshold. That threshold may be configurable. Each priority group may have a different threshold. The number of priority groups within an NCL may also be configurable and, thus, a number of thresholds may be implemented.

According to one embodiment, the priority assigned to a cell included within an NCL can be reduced when a given cell's signal quality passes through a threshold. Similarly, it will be appreciated that such thresholds can be configurable.

According to some embodiments, a network may be operable to signal to user equipment an initial assessment which orders cells in an NCL into priority groups. Such a pre-assignment of priority groups may allow user equipment to concentrate its measurements on cells which are deemed by the network to have high priority. A network may be operable to assign cells included within an NCL a priority based on user equipment RACH measurement reports. Such RACH reports may be sent by a given user equipment during RRC connection set-up.

According to some embodiments, the size of each priority group may be fixed. In other words, the number of cells assigned to each priority group may be fixed. By fixing a number of cells in each priority group, performance criteria may be predictable. Such an arrangement may allow for the provision of an expected performance from user equipment and an operator may be in a position to plan other aspects of network operation according to such performance criteria.

In some embodiments, where user equipment has some capability for knowing which LPNs are directly surrounding it, such user equipment may be operable to update cell priority allocated to those cells included in its NCL based on its relative location to detected LPNs. For example, the priority of an LPN may increase if its distance or proximity to user equipment is detected to be beneath a selected threshold value.

In some embodiments, where user equipment is operable to use proximity to allocate a priority to a set of cells included in an NCL, it may be that the user equipment is operable to measure only a sub-set of cells in the NCL which are of the highest priority. That is to say, whilst a full neighbour list can be provided to user equipment, only a sub-set of those cells (for example, the highest priority cells) in the NCL may be measured by the user equipment.

In further embodiments, a network may be operable to change user equipment priorities by direct signalling. Such an arrangement may allow a network to aid user equipment when allocating priorities to cells included in its NCL. It will be appreciated that a network may have more relevance network wide information which can be of use to user equipment when allocating priority to those cells included in its NCL. Such an arrangement may also give more control to a network rather than relying on autonomous operation of distributed user equipment roaming through a sector of a network.

It will be appreciated that a network may be operable to configure measurement reports performed by the user equipment and that the periodicity of such reports may be set by a network. Measurement performance requirements can be independent to those set periodicities. It is, of course, feasible that a network may be operable to receive the priority allocated to cells in an NCL from user equipment and configure its measurement report to the user equipment based on those priorities. For example, according to some embodiments, higher priority cells may be allocated more frequent periodic reports. This, of course, is a matter for configurable implementation.

In some embodiments, a network may be operable to request an update (for example, a snapshot) of a given user equipment priority group arrangement. Furthermore, in some embodiments a network may be operable to request an indication from user equipment of those cells in one or more of the priority groups implemented by user equipment.

It will be appreciated that aspects and embodiments described above are illustrated in relation to a UMTS network, but that such techniques may also be applicable within an LTE network. Although NCLs themselves may not be used in LTE networks, user equipment can use methodologies such as that described in relation to aspects and embodiments above to assign detected cells to different priority groups.

Figure 2:
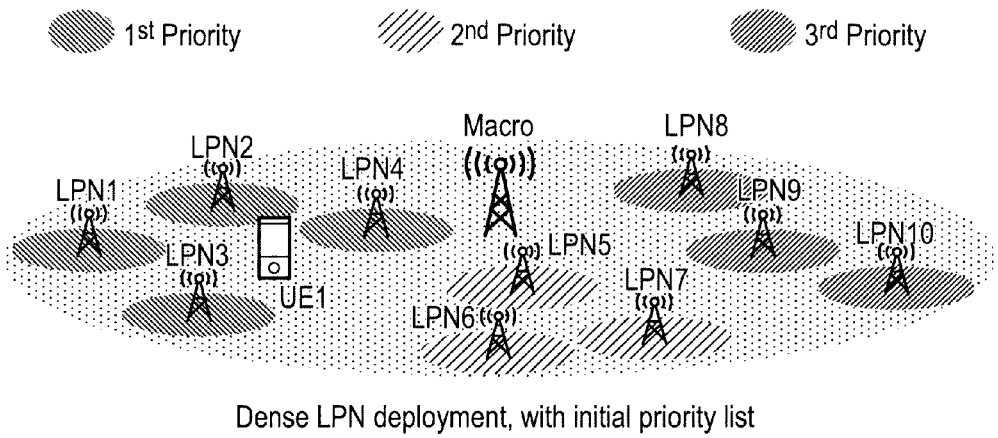
FIG. 2 illustrates schematically an example HetNet deployment having an initial priority list according to one embodiment.

FIG. 2 illustrates schematically a dense LPN deployment within a region of macro cell coverage. In the embodiment shown in FIG. 2, three priority groups are defined. The first priority group has the highest priority, and the third priority group has the lowest priority.

UE1 is located as shown in FIG. 2. A macro cell signals a large NCL containing all LPNs and other neighbouring macro cells to UE1. Given an initial UE location, a macro cell may be operable to signal an initial priority allocation as shown in FIG. 2. Such an arrangement assumes that an initial user equipment location can be signalled by the user equipment to the network when it first connects to a macro cell. As shown schematically in FIG. 2, LPN1, LPN2, LPN3 and LPN4 are placed in the user equipment's highest priority group and it is likely that the user equipment would implement more frequent measurements in respect of those cells.

Figure 3:
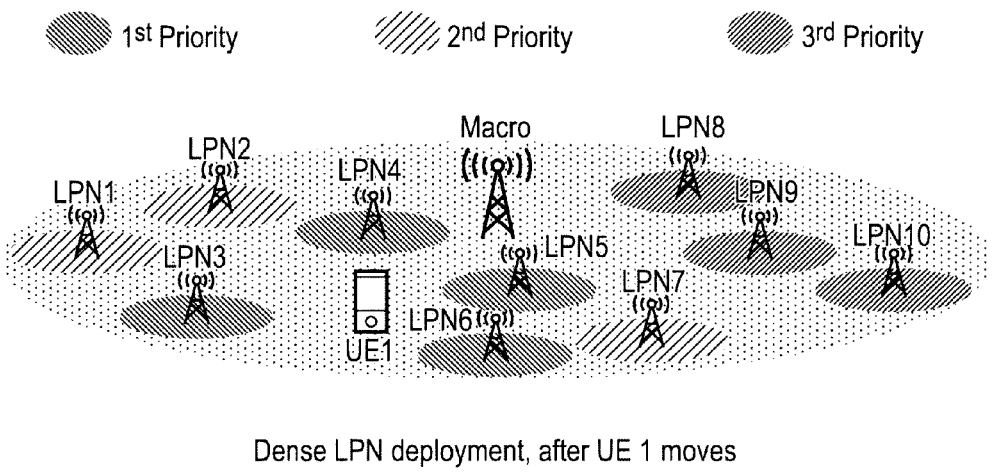
FIG. 3 illustrates schematically an example HetNet deployment having an updated priority list according to movement of a user.

FIG. 3 illustrates schematically the heterogeneous network shown in FIG. 2, where UE1 has moved to a position as shown in FIG. 3. In accordance with the implementation shown in FIGS. 2 and 3, the UE1 may be operable to determine that signals received from LPN1 and LPN2 have dropped below a threshold and, as a result, the user equipment may be operable to reduce their priority. Since the user equipment is also operable to perform measurements to those cells determined to have lower priorities at a much reduced rate, it may be operable, in due course, to realise that the signal quality from LPN5 and LPN6 has increased beyond the threshold required for entry to a first priority group. On detection of receipt of a signal quality from LPN5 and LPN6 which passes such a threshold, UE1 may be operable to move those LPNs into a group having the highest priority. Such a reassignment of priority is shown schematically in FIG. 3.

It will be appreciated that the method described in relation to FIGS. 2 and 3 may occur without any need for RRC signalling. As a result, user equipment can maintain measurement performance requirements on the sub-set of cells that have an impact to its mobility whilst maintaining a large NCL.

It will be appreciated that aspects and embodiments may define a means to manage an expected increase in size of an NCL in HetNet deployments without a need to significantly increase user equipment complexity to meet measurement performance requirements.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of influencing operation of user equipment in a wireless telecommunications network, said method comprising:
    providing said user equipment with a neighbour cell list;
    selecting at least one priority criteria to be applied by said user equipment to a cell included in said neighbour cell list, wherein said selecting includes receiving an indication of user equipment location and assigning a priority to each cell in said neighbour cell list based on said indication of user equipment location;
    communicating said selected priority criteria to said user equipment; and
    determining an action to be taken by said user equipment in relation to a cell meeting said priority criteria and communicating said action to said user equipment and wherein said action comprises:
    a measurement performance requirement to be applied in relation to a cell having a priority.

2. The method according to claim 1, wherein said indication of user equipment location comprises: measurement received from said user equipment.

3. The method according to claim 2, wherein said measurement comprises a RACH measurement report.

4. The method according to claim 2, wherein said measurement comprises a GPS report or a proximity report.

5. The method according to claim 1, wherein said priority criteria comprises:
    a threshold cell signal quality associated with a priority to be applied to a cell in said neighbour cell list by said user equipment.

6. The method according to claim 1, wherein said priority criteria comprises:
    a threshold proximity measurement associated with a priority to be applied to a cell in said neighbour cell list by said user equipment.

7. The method according to claim 1, wherein said priority criteria comprises:
    an indication of a number of cells in said neighbour cell list to be assigned to a priority.

8. The method according to claim 1, wherein said priority criteria comprises:
    an indication of a proportion of cells in said neighbour cell list to be assigned to a priority.

9. The method according to claim 1, wherein said action comprises:
    a periodicity associated with a measurement report applied in relation to a cell having a priority.

10. A non-transitory computer readable medium having thereon a program operable, when executed on a computer, to perform the method of claim 1.

11. A network control node operable to influence operation of user equipment in a wireless telecommunications network, said network control node comprising:
    neighbour cell list provision logic operable to provide said user equipment with a neighbour cell list;
    priority criteria selection logic operable to select at least one priority criteria to be applied by said user equipment to a cell included in said neighbour cell list, wherein said selection includes receiving an indication of user equipment location and assigning a priority to each cell in said neighbour cell list based on said indication of user equipment location;

communication logic operable to communicate said selected priority criteria to said user equipment; and determination logic operable to determine an action to be taken by said user equipment in relation to a cell meeting said priority criteria and communicate said action to said user equipment, wherein said action comprises:

a measurement performance requirement to be applied in relation to a cell having a priority.

* * * * *